May 12, 1953     T. N. FORTNEY     2,638,584

INTERMITTENT ELECTRIC LIGHT

Filed Oct. 13, 1952

INVENTOR.
THEODORE N. FORTNEY
BY *Samuel H. Davis*
ATTORNEY

Patented May 12, 1953

2,638,584

UNITED STATES PATENT OFFICE 2,638,584

INTERMITTENT ELECTRIC LIGHT

Theodore N. Fortney, Lansing, Mich.

Application October 13, 1952, Serial No. 314,505

1 Claim. (Cl. 340—366)

This invention relates to electric lights, is particularly concerned with intermittent electric lights, is more particularly concerned with intermittent electric lights for use in connection with motor vehicles; and is most particularly concerned with intermittent electric lights for use in connection with motor vehicles and which obtains its source of current through the storage battery system, and which is connected through the cigarette lighter of the vehicle.

In the past when a motor vehicle became stalled on the highway, it has been the practice to use flares to indicate that the vehicle is a hazard on the highway. The use of flares is not only inconvenient but is dangerous since there is danger of the open flame igniting the gasolene in the tank. Furthermore, the light of a flare is limited in duration. There are also other disadvantages in the use of such flares.

It is therefore an object of the present invention to provide an electric signal light. It is a further object to provide an intermittent electric signal light for use in motor vehicles when such vehicles are stalled on the highway. A still further object of the present invention is the provision of an intermittent signal light which obtains its current from the storage battery system of the vehicle, through the cigarette lighter of the vehicle.

I have now discovered and invented an intermittent signal light for use in connection with motor vehicles comprising a case, a bulb, a flasher unit, the said flasher unit being housed within the said case, the said flasher unit being adapted for intermittently lighting the said bulb, a fuse, a cable extending from the said light, a plug, the said plug adapted for fitting in a socket adapted for use with a cigarette lighter, the said cable having two wires, one of the wires being secured to the case, and the other wire being secured through the said fuse, through the flasher unit and to the socket of the said bulb, and hanger means for suspending the said light, and leg means for placing the said light on a flat surface, and am now able to avoid the disadvantages of the prior art and am able readily to accomplish the objects set forth.

While some of the more outstanding features, and advantages of this invention have been hereinbefore indicated, others will become apparent from the following disclosures, taken in conjunction with the accompanying drawing, in which.

Figure 2:
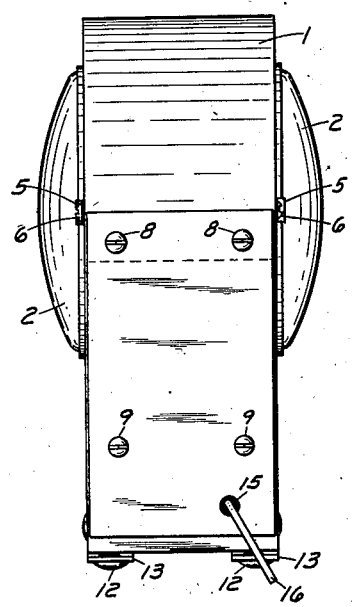
Fig. 2 is a right side view of Fig. 1 showing the flasher unit, and the fuse holder mounted to a plate.
Figure 1:
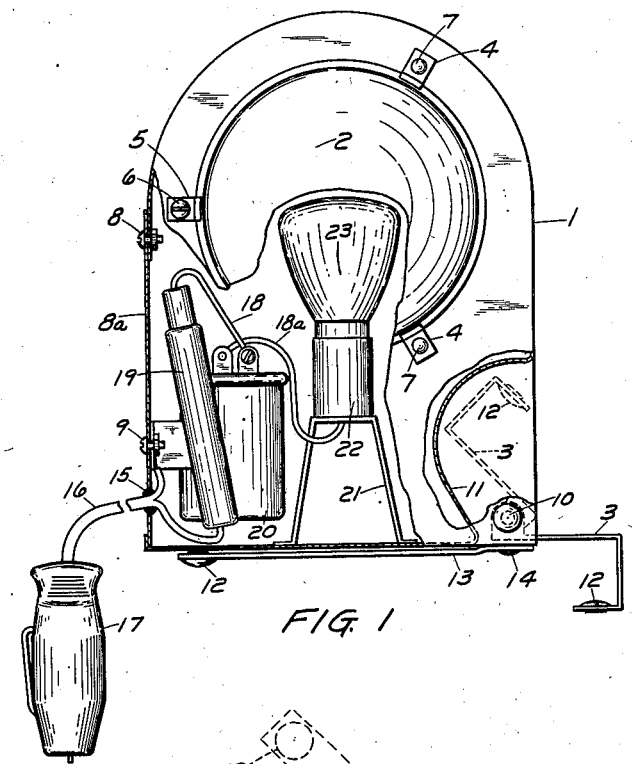
Fig. 1 is a plan view with a portion of the case and lens cut away to show the flasher assembly, and the window hanger.
Figure 3:
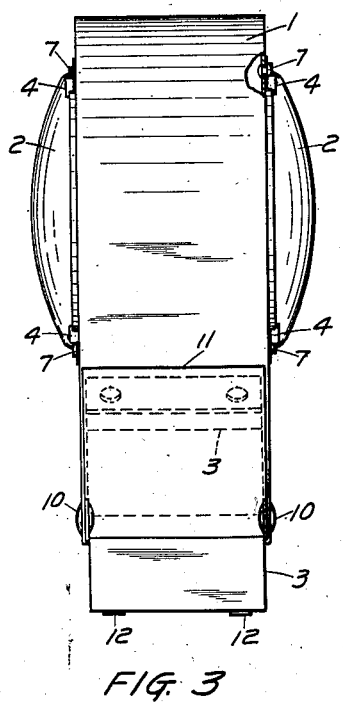
Fig. 3 is a left side view of Fig. 1 showing the compartment which houses the window hanger.

The housing or case 1 of my invention is made preferably of sheet metal. The two lenses 2 are disposed on either sides of the housing and are secured to the case by means of the clips 5 and the bolts 6, and the other clips 4 and their rivets 7. The lenses are readily removable by loosening the clips 4 and 5. The hanger 3 is swingable on the two rivets 10 which secure the hanger to the signal light. It wil be noted from the Fig. 1 that the hanger 3 may be swingably folded when not in use, and a compartment or housing 11 is provided. The plate 8a is secured to the case 1 by means of the two bolts 8. The plate 8a may be readily removed in the event that it is necessary to repair or replace members within the housing of the lamp. The bolt 9 is provided for securing the flasher mechanism 20 to the plate 8a. The fuse 19 is held in place by the wire 18.

Figure 4:
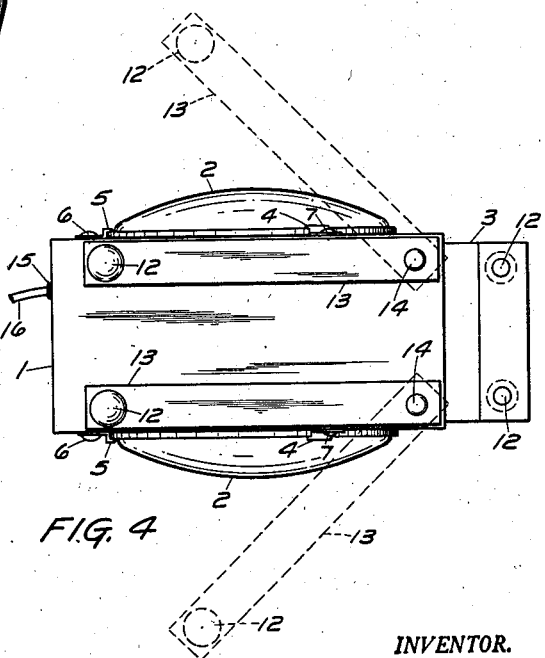
Fig. 4 is a bottom view showing the legs in open position for resting the device of my invention on a flat surface when the light is in use.

The rubber tips 12 are secured to the bottom of the case and together with the rivets 14 provide for an even stand for the lamp when the lamp is not in use. When the device is in use, the two legs 13, which are swingable on the two rivets 14, are swung away from the lamp and allow for a greater base. The two legs 13 may be folded as shown by the solid lines in the Fig. 4. The plate 8a has an opening near its lower portion and the hole is lined with a grommet 15 and provides a cushion for the wire 16 extending from the flasher unit to the plug 17. The plug 17 is structurally designed to fit into a cigarette lighter socket in the dash of the vehicle. The wire 18a leads from the flasher unit 20 to the socket 22, which socket provides a holder for the bulb 23. The socket 22 is mounted on the bracket 21, which bracket is secured to the floor of the signal light.

I wish particularly to point out that to facilitate supporting the signal lamp the hanger 3 may be used, and the lamp may be suspended by the said hanger from any portion of the vehicle, the door knob, for example. If it is desired to place the lamp on the ground, the swingable legs 13 may be swung away from the lamp, and the lamp may be readily placed on any flat surface.

I wish further particularly to point out that the lenses are preferably made of red glass or other transparent material, but may be of any other color which will serve the purpose equally.

The lamp may be stored in a small place in the motor vehicle, the glove compartment, for example, since it may be folded to occupy a very small amount of space. For use the lamp is taken out, the plug 17 is inserted into the cigarette lighter socket, and the lamp may be hung outside of the car, on the door knob, for example, by means of the hanger 3. Or if desired, the lamp may be placed on the ground, and be prevented from tipping over by means of the extended legs 13.

When the plug 17 is inserted into the cigarette lighter socket, the bulb lights intermittently and the light serves as a signal flasher to signify to the approaching drivers that a vehicle is stalled.

With this invention fully set forth it is maintained that a trouble light of appreciable utility is provided, and through the simplicity of construction thereof, it can be economically manufactured and sold at a very reasonable cost.

Having clearly set forth the construction, utility and advantages of my invention I wish particularly to state that it will be apparent that changes in the details of the construction and arrangement of the various members of the invention may be resorted to without departing from the spirit and scope of the invention as hereinafter claimed.

I claim:

A signal light for use in connection with a motor vehicle comprising a case, the said case being provided with an opening for inserting an electric cable, a bulb, a flasher unit, the said flasher unit being housed within the said case, the said flasher unit being adapted for intermittently lighting the said bulb, a fuse, a cable extending from the said light, a plug, the said plug adapted for fitting in a socket adapted for use with a cigarette lighter, the said cable having two wires, one of the wires being secured to the case, the other wire being secured through the said fuse, through the flasher unit and to the socket of the said bulb, and hanger means for suspending the said light, the said hanger means being pivotally secured to the lower side of the said case, a housing, the said housing being disposed substantially at the lower side of the said case and being integral with the said case, the said housing being adapted for storing the said hanger means, when the said hanger means is not in use, and leg means for placing the said light on a flat surface.

THEODORE N. FORTNEY.

References Cited in the file of this patent

UNITED STATES PATENTS

| Number | Name | Date |
|---|---|---|
| 2,165,562 | Mack et al. | July 11, 1939 |
| 2,469,581 | Slosar | May 10, 1949 |
| 2,491,094 | Du Frane | Dec. 13, 1949 |
| 2,496,618 | Cox et al. | Feb. 7, 1950 |
| 2,597,705 | Clines | May 20, 1952 |